US012663946B2

(12) United States Patent
Tanner et al.

(10) Patent No.: US 12,663,946 B2
(45) Date of Patent: Jun. 23, 2026

(54) DATA MEMORY UNIT FOR ELECTRIC SUBMERSIBLE PUMPING SYSTEM

(71) Applicant: Baker Hughes Oilfield Operations LLC, Houston, TX (US)

(72) Inventors: David Tanner, Broken Arrow, OK (US); Ryan Semple, Owasso, OK (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 479 days.

(21) Appl. No.: 18/103,830

(22) Filed: Jan. 31, 2023

(65) Prior Publication Data

US 2023/0244388 A1 Aug. 3, 2023

Related U.S. Application Data

(60) Provisional application No. 63/305,584, filed on Feb. 1, 2022.

(51) Int. Cl.
| | |
|---|---|
| *G06F 3/06* | (2006.01) |
| *E21B 43/12* | (2006.01) |
| *F04B 49/06* | (2006.01) |
| *F04D 13/06* | (2006.01) |
| *F04D 13/08* | (2006.01) |
| *F04D 27/00* | (2006.01) |

(52) U.S. Cl.
CPC .......... *G06F 3/0673* (2013.01); *E21B 43/128* (2013.01); *F04B 49/065* (2013.01); *F04D 13/0686* (2013.01); *F04D 13/08* (2013.01); *F04D 27/001* (2013.01); *G06F 3/0659* (2013.01)

(58) Field of Classification Search
CPC G01V 1/46; E21B 47/06; E21B 21/08; G06F 3/0659; G06F 3/0673
See application file for complete search history.

(56) References Cited

U.S. PATENT DOCUMENTS

| | | | |
|---|---|---|---|
| 6,167,965 B1 | 1/2001 | Bearden et al. | |
| 7,624,800 B2 | 12/2009 | Jamieson et al. | |
| 10,275,162 B2 * | 4/2019 | Kan ...................... | G06F 3/0647 |
| 10,329,894 B2 | 6/2019 | Elsaadi et al. | |
| 11,181,872 B1 * | 11/2021 | Herring, III ....... | G05B 13/0265 |

(Continued)

OTHER PUBLICATIONS

International Search Report and Written Opinion for PCT/US2023/011967 mailed Aug. 10, 2023.

*Primary Examiner* — Stephanie E Bloss
(74) *Attorney, Agent, or Firm* — Baker Hughes Company

(57) ABSTRACT

An electric submersible pumping system includes one or more sensors, a sensor module configured to receive and process data from the one or more sensors, and a data memory unit configured to store data received from the one or more sensors. The data memory unit can be used for storing data using methods that shift the frequency at which information is recorded from the sensors. In some embodiments, the method includes the steps of recording data from a sensor within the pumping system at a first frequency, detecting the occurrence of a frequency shifting event, and recording data from the sensor at a second frequency that is higher than the first frequency. The measurement data can be stored in volatile or non-volatile memory to create a record of high resolution measurement data surrounding a frequency shifting event.

16 Claims, 5 Drawing Sheets

(56) References Cited

U.S. PATENT DOCUMENTS

| 11,187,223 | B2 * | 11/2021 | Ward | F04B 49/065 |
|---|---|---|---|---|
| 11,340,579 | B2 * | 5/2022 | Livescu | G05B 19/4065 |
| 2015/0029036 | A1 * | 1/2015 | Xiao | E21B 47/12 |
| | | | | 340/855.3 |
| 2016/0328497 | A1 * | 11/2016 | Hamza | E21B 41/0035 |
| 2017/0107989 | A1 * | 4/2017 | Coste | E21B 43/128 |
| 2018/0003041 | A1 * | 1/2018 | Roberson | E21B 47/12 |
| 2018/0373428 | A1 * | 12/2018 | Kan | G06F 3/0616 |
| 2019/0063210 | A1 * | 2/2019 | Coste | F04D 15/0077 |
| 2019/0353156 | A1 | 11/2019 | Ward et al. | |
| 2020/0115975 | A1 * | 4/2020 | Camilleri | E21B 47/008 |
| 2020/0301393 | A1 | 9/2020 | Livescu et al. | |
| 2021/0350052 | A1 * | 11/2021 | AlQahtani | G06F 3/0482 |
| 2021/0388831 | A1 * | 12/2021 | Camacho Cardenas | F04B 7/04 |
| 2022/0196025 | A1 * | 6/2022 | Perevozchikov | F04D 27/0292 |
| 2022/0334582 | A1 * | 10/2022 | Bryner | B60B 19/12 |

* cited by examiner

Input                                    Data Storage                                    Output

DATA MEMORY UNIT FOR ELECTRIC SUBMERSIBLE PUMPING SYSTEM

RELATED APPLICATIONS

This application claims the benefit of U.S. Provisional Patent Application Ser. No. 63/305,584 filed Feb. 1, 2022 entitled, "Data Memory Unit for Electric Submersible Pumping System," the disclosure of which is herein incorporated by reference.

FIELD OF THE INVENTION

This invention relates generally to the field of submersible pumping systems, and more particularly, but not by way of limitation, to an improved monitoring system for measuring conditions within downhole pumping systems.

BACKGROUND

Submersible pumping systems are often deployed into wells to recover petroleum fluids from subterranean reservoirs. Typically, a submersible pumping system includes a number of components, including an electric motor coupled to one or more high performance pump assemblies. Production tubing is connected to the pump assemblies to deliver the petroleum fluids from the subterranean reservoir to a storage facility on the surface.

Modern submersible pumping systems are typically fitted with a number of sensors that are configured to monitor a variety of operational and environmental parameters. Sensors within pumping system are capable of monitoring motor drive output, motor operating temperature and speed, pump intake pressure, wellbore temperature, pump system vibration, current leakage, discharge temperature, flow rates and discharge pressure. In many cases, the various sensors within the pumping system are connected to a consolidated sensor module, or "gauge," located at the lower end of the pumping system. The gauge receives power from the motor and is configured to transfer information received from the various sensors to surface-based facilities.

Although advances in sensor and communications technologies have improved the ability to monitor the operation of the pumping system on a continuous, real-time basis, these sensor and gauge systems are not well equipped to manage information during failure events. Currently, data related to run life and failure analysis resides in many places, is inconsistently stored, or not available at all. For example, build data about the pumping system (e.g., component selection, manufacturing date, initial configuration) is often stored by a manufacturer, installation and retrieval information is often captured by a service company, and operational information is kept by the operator. In the event of a failure event, it can be difficult or impossible to gather necessary information from these separate sources. There is, therefore, a need for an improved system and method for acquiring, storing and reporting data from a pumping system that overcomes the deficiencies in the prior art.

SUMMARY OF THE INVENTION

In one aspect, embodiments of the present disclosure are directed to an electric submersible pumping system configured to produce fluids from a well, where the submersible pumping system includes one or more sensors, a sensor module configured to receive and process data from the one or more sensors, and a data memory unit configured to store data received from the one or more sensors.

In another aspect, embodiments of the present invention are directed to a method for storing data for a pumping system from one or more sources. The method includes the steps of recording data from a sensor within the pumping system at a first frequency, aggregating the data recorded at the first frequency on a rolling basis, storing the aggregated data in a non-volatile memory module, detecting the occurrence of a frequency shifting event, and storing the data recorded at the first frequency in the non-volatile memory module for the duration of the frequency shifting event.

In another aspect, embodiments of the present invention are directed to a method for storing data for a pumping system from one or more sources. The method includes the steps outputting measurement data from a sensor within the pumping system, receiving or retrieving the measurement data at a data memory unit within the pumping system, storing the measurement data in a volatile memory module within the data memory unit, and aggregating the measurement data in the volatile memory module, and storing the aggregated measurement data in a non-volatile memory module. The method further includes the steps of detecting the occurrence of a frequency shifting event and transferring unaggregated measurement data from the volatile memory module to the non-volatile memory module.

WRITTEN DESCRIPTION

Figure 1:
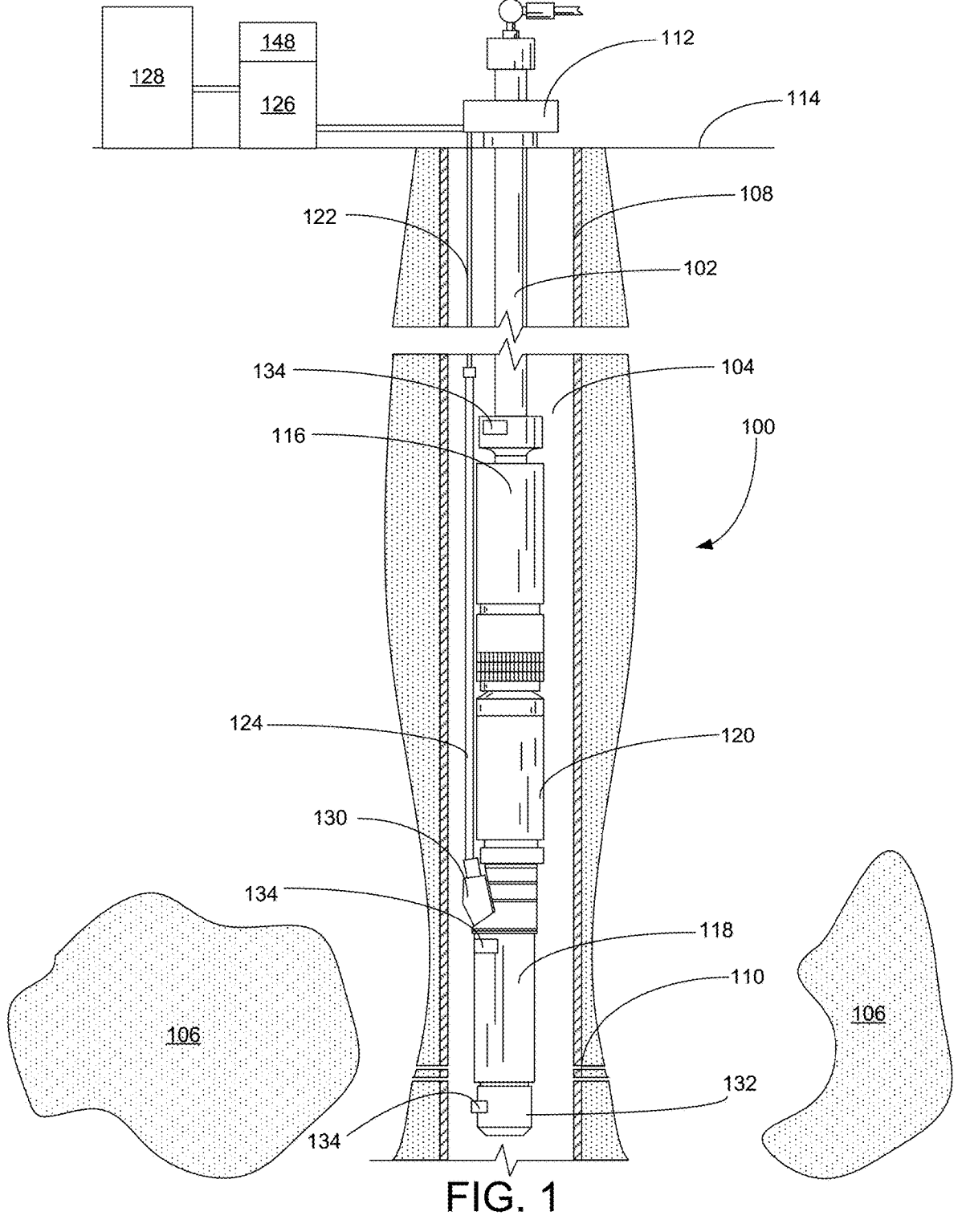
FIG. 1 is an elevational depiction of an electric submersible pumping system.

In accordance with an exemplary embodiment of the present invention, FIG. 1 shows a front view of a downhole pumping system 100 attached to production tubing 102. The downhole pumping system 100 and production tubing 102 are disposed in a wellbore 104, which is drilled for the production of a fluid such as water or petroleum from a subterranean geologic formation 106.

The wellbore 104 includes a casing 108, which has perforations 110 that permit the exchange of fluids between the wellbore 104 and the geologic formation 106. Although the downhole pumping system 100 is depicted in a vertical well, it will be appreciated that the downhole pumping system 100 can also be used in horizontal, deviated, and other non-vertical wells. Accordingly, the terms "upper" and "lower" should not be construed as limiting the disclosed embodiments to use in vertical wells.

The production tubing 102 connects the pumping system 100 to a wellhead 112 located on the surface 114, which may be onshore or offshore. Although the pumping system 100 is primarily designed to pump petroleum products, it will be understood that the present invention can also be used to move other fluids. It will also be understood that, although each of the components of the pumping system 100 are primarily disclosed in a submersible application, some or all of these components can also be used in surface pumping operations.

The pumping system 100 includes a pump 116, a motor 118 and a seal section 120. The motor 118 is an electric motor that receives its power from a surface-based supply through a power cable 122 and one or more motor lead extensions 124. In many embodiments, the power cable 122 and motor lead extension 124 are configured to supply the motor 118 with three-phase electricity from a surface-based variable speed (or variable frequency) motor drive 126, which receives electricity from a power source 128. The electricity is carried along separate conductors (not separately designated), which each correspond to a separate phase of the electricity. The motor lead extension 124 connects to the motor 118 through a connector 130, which is often referred to as a "pothead" connector. The motor lead extension 124 extends into the pothead 130, where it terminates in a connection to the conductor leads of the motor 118. The pothead connector 130 relieves mechanical stresses between the motor lead extension 124 and the motor 118, while providing a sealed connection that prevents the ingress of wellbore fluids into the motor 118, motor lead extension 124, or pothead 130.

The motor 118 converts the electrical energy into mechanical energy, which is transmitted to the pump 116 by one or more shafts. The pump 116 then transfers a portion of this mechanical energy to fluids within the wellbore 104, causing the wellbore fluids to move through the production tubing 102 to the surface 114. In some embodiments, the pump 116 is a turbomachine that uses one or more impellers and diffusers to convert mechanical energy into pressure head. In other embodiments, the pump 116 is a progressive cavity (PC) or positive displacement pump that moves wellbore fluids with one or more screws or pistons.

The seal section 120 shields the motor 118 from mechanical thrust produced by the pump 116. The seal section 120 is also configured to prevent the introduction of contaminants from the wellbore 104 into the motor 118, while also accommodating the thermal expansion and contraction of lubricants within the motor 118. Although only one pump 116, seal section 120 and motor 118 are shown, it will be understood that the downhole pumping system 100 could include additional pumps 116, seal sections 120 or motors 118.

The pumping system 100 also includes a gauge or sensor module 132 connected to the motor 118. As depicted in FIG. 1, the motor 118 is positioned between the sensor module 132 and the seal section 120. In other embodiments, the sensor module 132 can be located elsewhere in the pumping system 100, for example, between the motor 118 and the seal section 120. The sensor module 132 includes hardware for receiving and processing signals from remote sensors 134 located throughout the pumping system 100, which are configured to measure operational and environmental conditions at the pumping system 100. The sensors 134 can be configured to measure a variety of parameters, including intake pressure, discharge pressure, vibration, motor temperature, downhole pressure and temperature, and motor voltage. The sensor module 132 can also include communications circuits for transmitting and receiving data from equipment located on the surface 114 or elsewhere in the wellbore 104.

Figures 2A, 2B:
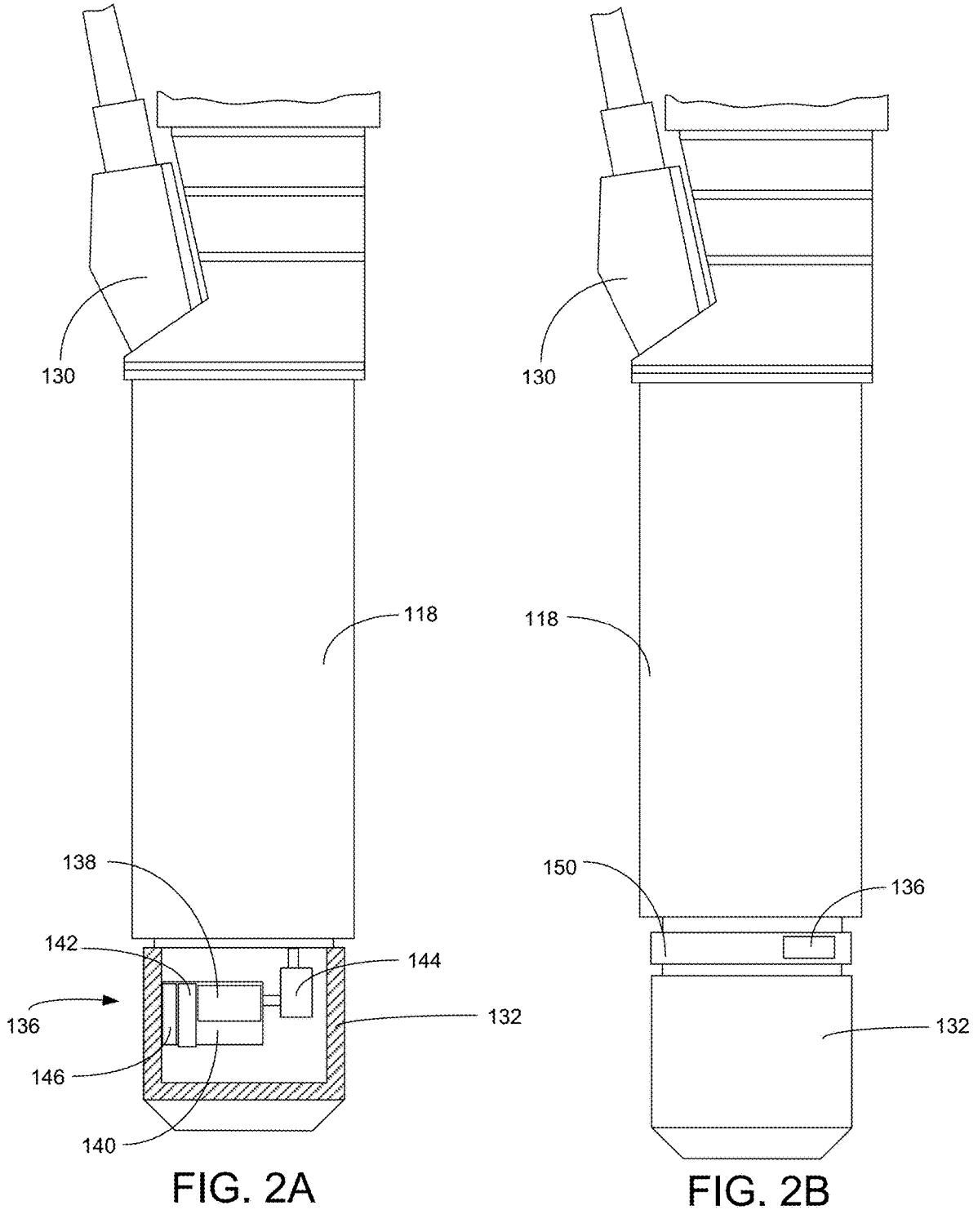
FIG. 2A illustrates the placement of the data memory unit inside the gauge at the lower end of the motor.
FIG. 2B illustrates the placement of the data memory unit inside a data memory unit module between the gauge and the motor.

Turning to FIGS. 2A and 2B, shown therein are cross-sectional and side views, respectively, of the motor 118, sensor module 132 and pothead 130. The pumping system 100 includes an onboard data memory unit 136 that is configured to store information received from the various sensors 134. The data memory unit 136 includes a volatile memory module 138, a non-volatile memory module 140, and a controller 142. The data memory unit 136 may also include a backup battery 144 which is designed to provide power to the data memory unit 136 in the event the data memory unit 136 loses power from the pumping system 100 or for recording measurements before the pumping system 100 has been connected to power. The sensor module 132 can, for example, be configured to record data from connected vibration, shock and temperature sensors 134 while parts of the pumping system 100 are packaged, transported and assembled before being connected to the power cable 122 and installed in the wellbore 104.

The data memory unit 136 further includes a communications module 146 that can be used to input and retrieve information from the data memory unit 136. Data can be pulled from the data memory unit 136 with a direct persistent connection to the data memory unit 136, or though periodic "push" transfers from the data memory unit 136 or sensor module 132 to surface-based monitoring systems 148 through the communications module 146. It will be appreciated that the various components within the data memory unit 136 may be discrete hardware components or presented as functional, software-enabled components within one or more consolidated components within the data memory unit 136.

In FIG. 2A, the data memory unit 136 is contained inside the sensor module 132. In FIG. 2B, the data memory unit 136 is contained within a separate data memory unit sub 150 that is positioned between the sensor module 132 and the motor 118. It will be appreciated that the data memory unit 136 could also be placed in other areas of the pumping system 100, or that multiple data memory units 136 could be installed in the pumping system 100. In each case, the data memory unit 136 is optimally located inside a robust housing that protects the data memory unit 136 against damage during the installation, operation, and retrieval of the pumping system 100.

Figure 3:
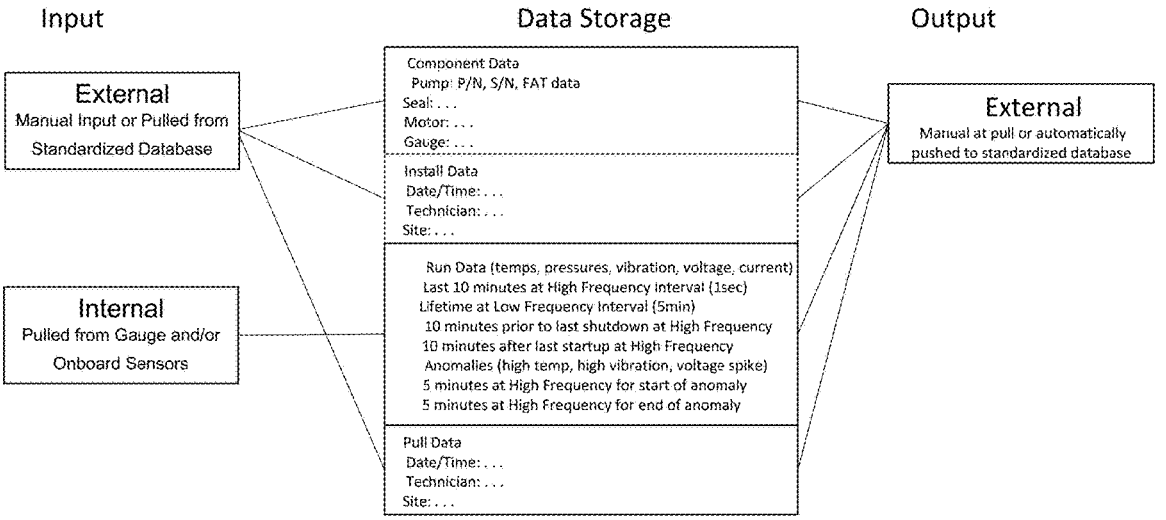
FIG. 3 provides a block diagram showing basic inputs, storage schemes and outputs for the data memory unit.

Turning to FIG. 3, shown therein is a block diagram illustrating the basic flow of data and information through the data memory unit 136. Reference data from sources external to the pumping system 100 can be manually or automatically loaded in the data memory unit 136. This pre-operational reference data includes data from manufacturing, assembly, configuration, transportation, installation and retrieval activities related to the pumping system 100. Measured data from internal sources within the pumping system 100 is acquired from the sensor module 132 or directly from the various sensors 134 located throughout the pumping system 100. The data is stored according to a database schema within the data memory unit 136, which may place data in one or both of the volatile memory module 138 and non-volatile memory module 140. It will be appreciated that the volatile memory module 138 and non-volatile memory module 140 can be physically distinct storage devices, e.g., multiple solid state memory chips designated as either volatile or non-volatile memory, or functionally distinct portions of common storage devices, e.g., designated portions of one or more solid state memory chips.

Importantly, the data memory unit 136 is provided with control programming implemented by the controller 142 that adapts the sampling rate of the data memory unit 136 to optimize the storage of useful information within the data memory unit 136. For example, during routine, steady state operation, the data memory unit 136 can be configured to store data retrieved or received from the sensors 134 on low frequency intervals to preserve data storage space within the data memory unit 136. Low frequency intervals include, for example, 1 measurement stored every 5 minutes, 1 measurement stored every 10 minutes, 1 measurement stored every 15 minutes, 1 measurement stored every 20 minutes, etc.

The data memory unit 136 can also operate in a high frequency sampling mode in which measurements retrieved or received from the sensors 134 are recorded on a high frequency basis. High frequency intervals include, for example, 1 measurement stored every second, multiple measurements stored every second, 1 measurement stored every 30 seconds, etc. As used herein and unless otherwise specified, the term "low frequency intervals" refers to measurements stored in the data memory unit 136 less frequently than 1 measurement stored every minute, and the term "high frequency intervals" refers to measurements stored in the data memory unit 136 more frequently than 1 measurement stored every minute. It will be appreciated that the data memory unit 136 can store data received or retrieved from the sensors 134 at two or more frequencies.

Figure 4:
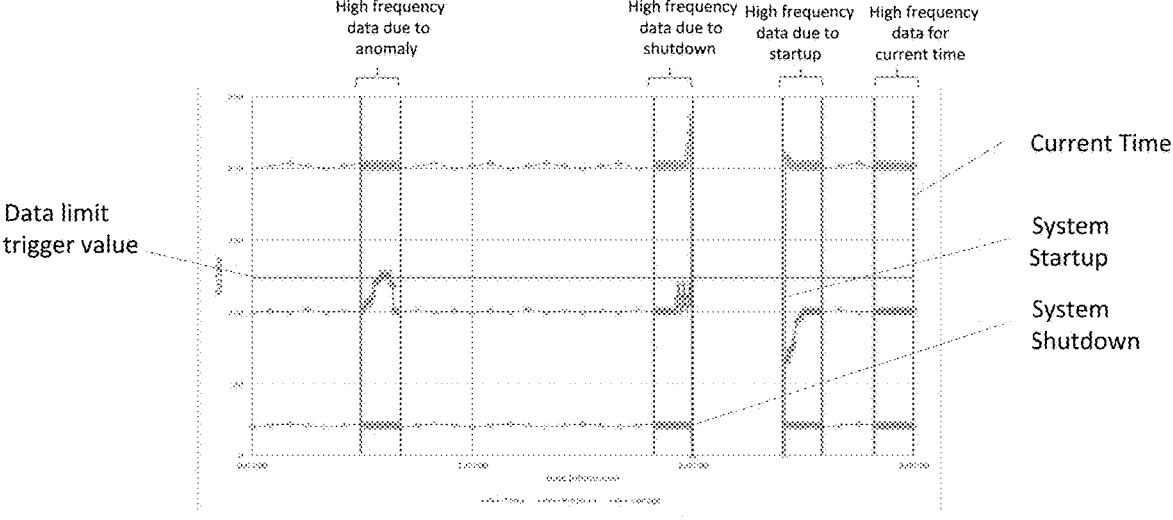
FIG. 4 illustrates a variable frequency sampling scheme that can be invoked by the data memory unit.

As illustrated in the time series graph of FIG. 4, the data memory unit 136 can be configured to detect and respond to a variety of frequency shifting events, which allows the data memory unit 136 to obtain extended, high-resolution data during critical events while discarding routine or redundant data during normal operating conditions. Frequency shifting events include, for example, motor startup, motor shutdown, loss of power to the pumping system 100, initial operation of the pumping system 100, an unexpected load on the pumping system 100, and the detection of an anomaly event. Anomaly events can include measurements obtained by the sensors 134 that exceed a threshold value or expected range of values, either on a discrete or aggregated basis. Anomaly events include, for example, measurements indicating motor internal temperature out of expected range, motor vibration out of expected range, pump intake pressure out of expected range, pump discharge pressure out of expected range, pump intake gas fraction out of expected range, motor load out of expected range, and motor speed out of expected range. The expected ranges for these measured parameters can be loaded into the data memory unit 136 as reference (or external) data and updated during the operation of the pumping system 100. The data memory unit 136 can be configured to send an alert to an operator that a frequency-shifting event has occurred.

For example, as depicted in FIG. 4, the sensor module 132 detected a motor temperature that exceeds a preestablished threshold value indicating that the measured motor temperature fell outside the expected temperature range. The data memory unit 136 is configured to automatically preserve the high frequency data surrounding the high temperature event by transferring that high-resolution data into the non-volatile memory module 140. Once the motor temperature anomaly event passes, the data memory unit 136 can return to the low-frequency sampling mode in which only periodic or averaged or summarized data is stored in the long-term, non-volatile memory module 140 for trend-focused analysis over a prolonged period. This control scheme ensures that the data memory unit 136 captures high-resolution data while the pumping system 100 is experiencing important events, while discarding unneeded or redundant data during normal operation to preserve storage space within the data memory unit 136.

Figures 5, 6:
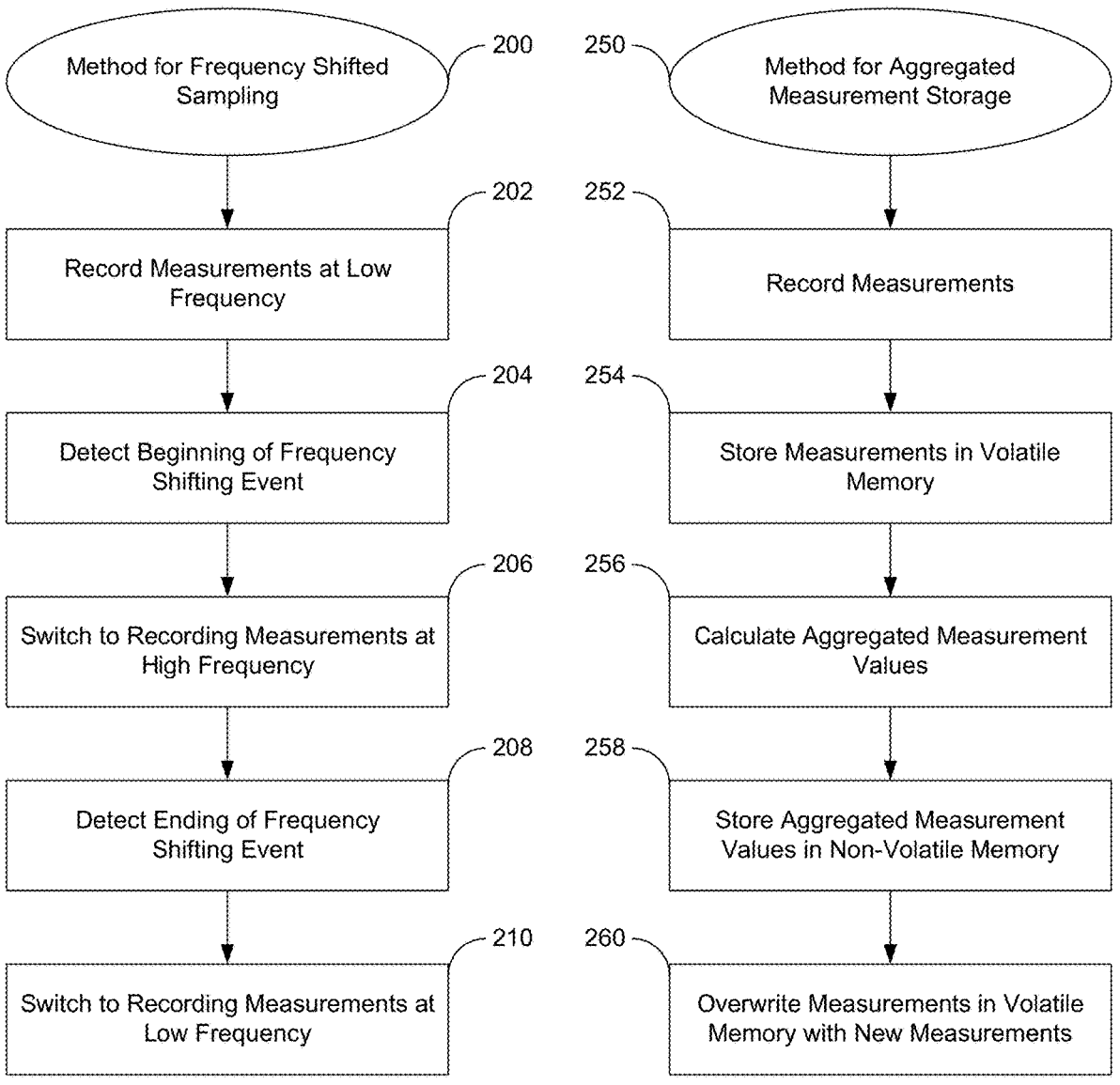
FIG. 5 is a process flow diagram for a method of frequency-shifted sampling.
FIG. 6 is a process flow diagram for a method of aggregated measurement storage.

In one mode of operation depicted in FIG. 5, the data memory unit 136 is initially placed in a low frequency mode of operation at block 202. Information from the sensors 134 is provided to the data memory unit 136 and stored on a low-frequency periodic basis to preserve data storage space within the data memory unit 136. If the data memory unit 136 detects the beginning of a frequency shifting event at block 204, the data memory unit 136 shifts into a high frequency mode at block 206 in which measured data is stored on a high frequency basis in the data memory unit 136. The high frequency mode of operation ensures that high resolution data is available after the detection of a frequency shifting event. At block 208, the data memory unit 136 detects that the frequency shifting event has ended. The data memory unit 136 shifts back to the low frequency recording mode of operation at block 210.

For low frequency, long-term measurements, the data memory unit 136 can also be configured to calculate a rolling average for the measurements made over a specified period. The discrete measurements can be stored in the volatile memory module 138 on a temporary basis while the rolling average can be periodically determined by the controller 142 and then stored in the non-volatile memory module 140. In this way, the data memory unit 136 can be configured to record data at a high frequency into the volatile memory module 138, move the summarized or averaged data into the non-volatile memory module 140, and then allow the current "high frequency" data to be overwritten with fresh high frequency data on a rolling basis. The storage of aggregated data recorded over a prolonged period can provide, for example, trend-based information on operational and environmental changes occurring over weeks or months of the operation of the pumping system 100.

FIG. 6 depicts a mode of operation 250 in which the data memory unit 136 is configured to receive or retrieve measurement data from the sensors 134 at either a high or low frequency at block 252. The measurement data is stored in the volatile memory module 138 at block 254. At block 256, the data memory unit 136 calculates a summarized or aggregated measurement value for the data stored in the volatile memory module 138. The summarized or aggregated measurement value can be determined, for example, by applying a rolling average algorithm to the measurement data stored in the volatile memory module 138. At step 258, the aggregated measurement values are stored in the non-volatile memory module 140. Once the aggregated measurement values have been stored in the non-volatile memory module 140, the process proceeds to block 260 where the data in the volatile memory module is overwritten with fresh measurement data retrieved or received from the sensors 134.

Figure 7:
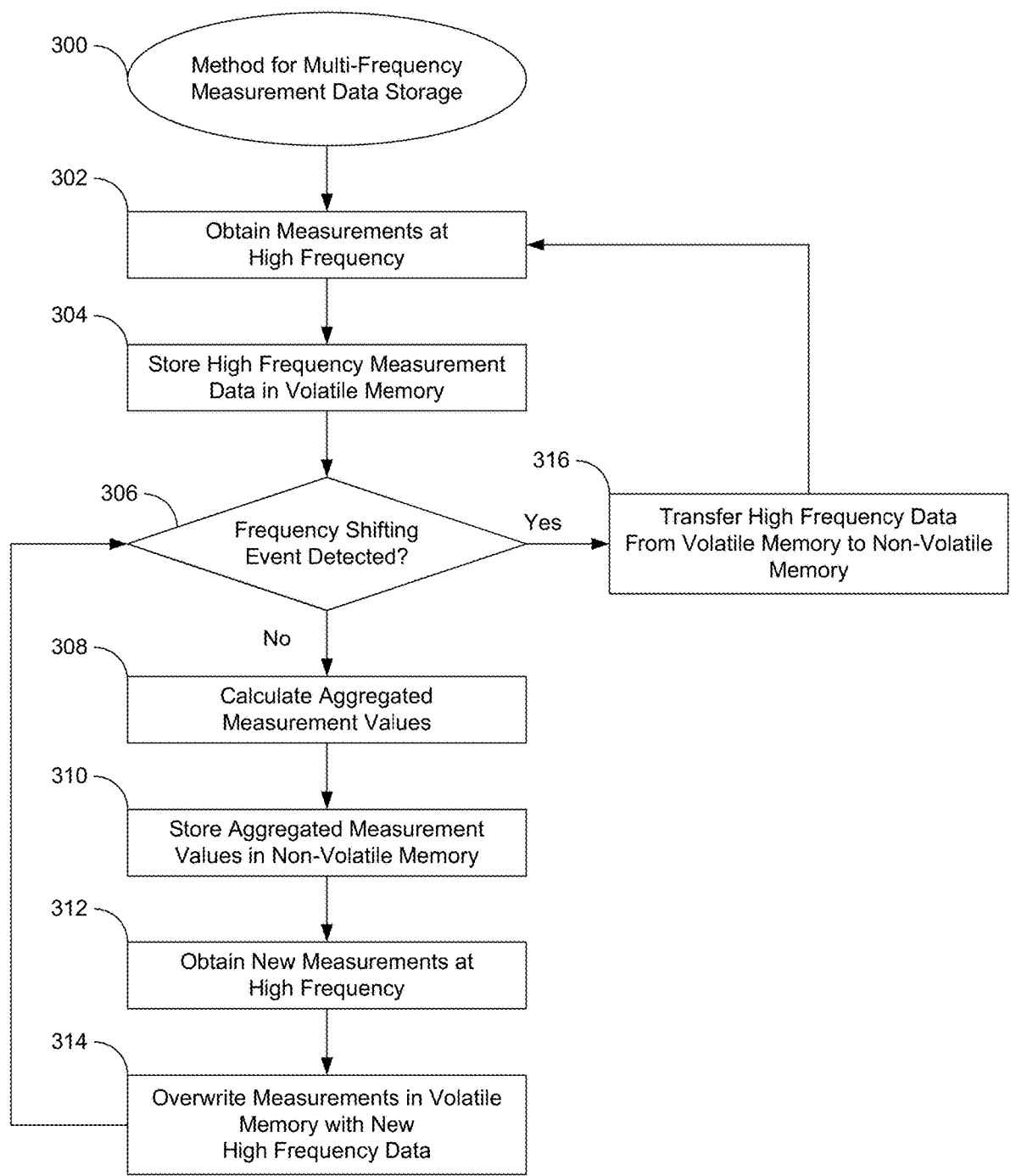
FIG. 7 is a process flow diagram for a method for multi-frequency measurement data storage.

Turning to FIG. 7, depicted therein is a flow diagram for a method multi-frequency measurement data storage 300. At block 302, measurement data is retrieved or received by the data memory unit 136 at a first frequency. In some embodiments, the first frequency is a high frequency. At block 304, the data memory unit 136 stores the measurement data obtained at block 302 in the volatile memory module 138.

At decision block 306, the data memory unit 136 determines if a frequency shifting event has been detected. If a frequency shifting event has not been detected, the process proceeds to block 308 and the data memory unit 136 calculates an aggregated measurement value based on a plurality of discrete measurements obtained and stored in blocks 302 and 304. The aggregated measurement value is stored in the non-volatile memory module 140 at block 310. The process continues to block 312 where new measurement data is obtained from the sensors 134. At block 314, the new data can be used to overwrite the data in the volatile memory module 138 that has already been aggregated and stored in the non-volatile memory module 140 at block 310. It will be understood that notwithstanding the stepwise progression illustrated in FIG. 7, the processes of obtaining data, aggregating data and storing the aggregated data can occur contemporaneously on a rolling basis as new data is obtained by the data memory unit 136.

If a frequency shifting event is identified at block 306, the process shifts to block 316 where the measurement data stored in the volatile memory module 138 is transferred to the non-volatile memory module 140. Thus, rather than aggregating the data at block 308, the high-resolution, high-frequency measurement data is transferred to the non-volatile memory module 140 to provide detailed information from the sensors 134 before the frequency shifting event occurred. The process 300 loops between blocks 316, 302, 304 and 306 until the frequency shifting event is no longer detected.

For example, if the pumping system 100 experiences an unexpected load that qualifies as a frequency shifting event, the data memory unit 136 can transfer to the non-volatile memory module 140 the high-resolution data obtained from the sensors 134 and stored in the volatile memory module 138 prior to the identification of the frequency shifting event. This allows the data memory unit 136 to create a detailed record that includes measurements taken before and during the frequency shifting event.

The data memory unit 136 is thus configured to provide an efficient mechanism for obtaining high-resolution event-specific data and trending long-term data for the pumping system 100 from external (e.g., reference) and internal (e.g., measured) sources. Consolidating this data within the pumping system 100 facilitates and improves the analysis of general and specific operating characteristics and failure events for the pumping system 100 or components within the pumping system 100.

It is to be understood that even though numerous characteristics and advantages of various embodiments of the present invention have been set forth in the foregoing description, together with details of the structure and functions of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. It will be appreciated by those skilled in the art that the teachings of the present invention can be applied to other systems without departing from the scope and spirit of the present invention.

What is claimed is:

1. An electric submersible pumping system configured to produce fluids from a well, the submersible pumping system comprising:

one or more sensors;

a sensor module configured to receive and process data from the one or more sensors, wherein the sensor module is located in the well; and

a data memory unit configured to store data received from the one or more sensors, wherein the data memory unit is located in the well and wherein the data memory unit comprises:

a volatile memory module;

a non-volatile memory module; and a controller configured to automatically shift the frequency at which data is stored in the non-volatile memory module in response to the detection by the data memory unit that a frequency shifting event has occurred.

2. The electric submersible pumping system of claim 1 further comprising a motor and wherein the sensor module is connected to the motor.

3. The electric submersible pumping system of claim 1, wherein the data memory unit further comprises a battery backup.

4. The electric submersible pumping system of claim 1, wherein the data memory unit is contained within the sensor module.

5. The electric submersible pumping system of claim 1, wherein the data memory unit is contained within a dedicated data memory sub.

6. A method for storing data for a pumping system from one or more sources, the method comprising the steps of:

recording data from a sensor within the pumping system at a first frequency, wherein the data is recorded within a volatile memory module of an onboard data memory unit within the pumping system;

aggregating the data recorded at the first frequency within the volatile memory module on a rolling average basis;

moving the aggregated data to a non-volatile memory module within the onboard data memory unit;

detecting the occurrence of a frequency shifting event;

automatically changing the storage location of the data recorded at the first frequency from the volatile memory module to the non-volatile memory module for the duration of the frequency shifting event.

7. The method of claim 6, further comprising the step of discarding the data recorded at the first frequency from the volatile memory module after the step of storing the aggregated data in the non-volatile memory module.

8. The method of claim 6, wherein the step of detecting the occurrence of a frequency shifting event further comprises detecting an occurrence of an anomaly event.

9. The method of claim 8, wherein the step of detecting the occurrence of the anomaly event comprises determining that recorded data from the sensor within the pumping system falls outside an expected range for the recorded data.

10. The method of claim 9, wherein the step of detecting an anomaly event comprises determining that recorded motor internal temperature data is out of the expected range.

11. The method of claim 9, wherein the step of detecting an occurrence of a frequency shifting event further comprises determining that recorded motor vibration data is out of the expected range.

12. The method of claim 9, wherein the step of detecting an occurrence of a frequency shifting event further comprises determining that recorded pump intake pressure is out of the expected range.

13. A method for storing data for a submersible pumping system from one or more sources, the method comprising the steps of:

outputting measurement data from a sensor within the submersible pumping system;

receiving or retrieving the measurement data at a data memory unit within the submersible pumping system;

storing the measurement data in a volatile memory module within the data memory unit;

aggregating the measurement data in the volatile memory module;

moving the aggregated measurement data in a non-volatile memory module;

recording additional measurement data at the volatile memory module of the data memory unit within the submersible pumping system;

detecting the occurrence of a frequency shifting event; and automatically transferring the additional measurement data in an unaggregated form from the volatile memory module to the non-volatile memory module.

14. The method of claim 13, wherein the frequency shifting event comprises the installation or retrieval of the submersible pumping system.

15. The method of claim 13, wherein the frequency shifting event comprises an anomaly event detected by the sensor.

16. The method of claim 13, further comprising the step of alerting an operator that the frequency shifting event has occurred.

\* \* \* \* \*